(12) United States Patent
Matsubayashi et al.

(10) Patent No.: US 7,241,132 B2
(45) Date of Patent: Jul. 10, 2007

(54) BACKFLOW PREVENTION DEVICE FOR IN-LINE SCREW INJECTION MOLDING MACHINE

(75) Inventors: Haruyuki Matsubayashi, Numazu (JP); Keisuke Mori, Numazu (JP); Shigehiro Saitou, Numazu (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 101 days.

(21) Appl. No.: 10/995,413

(22) Filed: Nov. 24, 2004

(65) Prior Publication Data

US 2005/0129802 A1    Jun. 16, 2005

(30) Foreign Application Priority Data

Dec. 12, 2003    (JP) .............................. 2003-414422

(51) Int. Cl.
*B29C 45/52* (2006.01)

(52) U.S. Cl. ...................... 425/559; 425/563; 425/587; 425/DIG. 224

(58) Field of Classification Search ................ 425/204, 425/208, 209, 559, 562, 563, 586, 587, DIG. 224
See application file for complete search history.

(56) References Cited

U.S. PATENT DOCUMENTS 4,105,147 A * 8/1978 Stubbe ........................ 222/413
4,988,281 A * 1/1991 Heathe et al. ............... 425/559
5,002,717 A * 3/1991 Taniguchi .................. 264/328.1
5,112,213 A * 5/1992 Oas ............................. 425/562
6,007,322 A * 12/1999 Suumen et al. ............. 425/557
6,613,265 B1 * 9/2003 Konno ...................... 264/328.1

FOREIGN PATENT DOCUMENTS

| JP | 60-076321 |   | 4/1985 |
| JP | 60-201921 | * | 10/1985 |
| JP | 62019423 A |   | 1/1987 |
| JP | 63-260414 |   | 10/1988 |
| JP | 1-242222 | * | 9/1989 |

* cited by examiner

*Primary Examiner*—Robert Davis
*Assistant Examiner*—Joseph Leyson
(74) *Attorney, Agent, or Firm*—DLA Piper US LLP

(57) ABSTRACT

A screw tip is provided in front of a screw with a shaft interposed therebetween, and a check ring is fitted around the shaft. The check ring is separated from a front end portion of the screw when the screw is rotated in a forward direction. The check ring contacts the front end portion of the screw when the screw is advanced. A front end surface of the check ring is provided with teeth, and a rear end surface of the screw tip is provided with grooves with which the respective teeth are engaged. Respective one side surfaces of the grooves and the teeth which are pressed against each other when the screw is rotated in the forward direction are formed vertical to the front end surface of the check ring, and side surfaces thereof located on the reverse sides of the above respective one side surfaces are inclined.

1 Claim, 2 Drawing Sheets

BACKFLOW PREVENTION DEVICE FOR IN-LINE SCREW INJECTION MOLDING MACHINE

CROSS-REFERENCE TO RELATED APPLICATIONS

This application is based upon and claims the benefit of priority from prior Japanese Patent Application No. 2003-414422, filed Dec. 12, 2003, the entire contents of which are incorporated herein by reference.

BACKGROUND OF THE INVENTION

1. Field of the Invention

This invention relates to a backflow prevention device which prevents backflow of resin from the front of a screw to the surroundings of the screw in an in-line screw type injection molding machine.

2. Description of the Related Art

In an in-line screw type injection molding machine, used is an injection apparatus in which a screw is incorporated into a heating barrel. When the screw is rotated in a forward direction in the heating barrel, raw resin is introduced from a hopper into the heating barrel, and transferred forward by the screw. The raw resin is molten in the heating barrel while being stirred and heated, and sent to the front of the screw (this step is called "charging step"). After a molten resin of a predetermined amount is stored in the heating barrel, the screw is advanced and the molten resin is filled in a mold (this step is called "filling step").

In the injection apparatus having the above structure, a backflow prevention device is provided between a screw tip (provided at a distal end of the screw) and the screw to prevent backflow of resin from the front to the surroundings of the screw. The structures of conventional backflow prevention devices are disclosed in, for example, Jpn. Pat. Appln. KOKAI Pub. No. 60-076321 and Jpn. Pat. Appln. KOKAI Pub. No. 63-260414.

FIG. 5 is a schematic diagram of a backflow prevention device disclosed in Jpn. Pat. Appln. KOKAI Pub. No. 63-260414. In the backflow prevention device, a check ring 20 is provided between a screw tip 21 and a screw 11. Teeth 22 are provided in a front end surface of the check ring 20. Grooves 23 with which the respective teeth 22 are engaged are provided in a rear end surface of the screw tip 21. Each tooth 22 is provided with an inclination on a side surface against which the engaged groove 23 is pressed when the screw 11 is rotated in the forward direction, such that the width of each tooth 22 is gradually narrowed toward the distal end thereof. The side surface reverse to the inclined side surface of each tooth 22 is formed vertical to the front end surface of the check ring 20. In conformity with this, each groove 23 is provided with an inclination of the same angle as that of the teeth 22 on a side surface which is pressed against the corresponding tooth 22 when the screw 11 is rotated in the forward direction, such that the width of each groove 23 is gradually narrowed toward the bottom thereof. A side surface reverse to the inclined surface of each groove 23 is formed vertical to the rear end surface of the screw tip 21.

By the above structure, the above backflow prevention device decreases the surface pressure in engaging portions between the teeth 22 and the respective grooves 23, to improve in the mechanical strength.

In addition, in the charging step, the check ring 20 is pushed back to the screw 11 side by a component generated by the inclination of the teeth 22, and thereby moves in a direction of closing the space between itself and the front end surface of the screw 11. Therefore, the resin path can be quickly closed when the subsequent injection step is started.

However, if suckback operation is performed after completion of the charging step, that is, in the case of performing an operation of slightly rotating the screw 11 in the backward direction, the component in the direction of closing the space between the check ring 20 and the front end portion of the screw 11 does not act on the check ring 20, and there is the fear that the resin path of the backflow prevention device is opened. Therefore, after completion of the charging step and before start of the filling step, the resin leaks from the surroundings of the screw to the front of the screw tip, and as a result there is a possibility of deteriorating uniformity of the resin amount filled in the mold.

BRIEF SUMMARY OF THE INVENTION

This invention has been made in view of the above problems of the conventional backflow prevention device in the in-line screw type injection molding machine. The object of the present invention is to provide a backflow prevention device which prevents opening of the resin path of the backflow prevention device in suckback operation, and thereby securely prevents leak of resin from the surroundings of the screw to the front of the screw tip between the charging step and the filling step.

A backflow prevention device for an in-line screw type injection molding machine of the present invention, which is a device being used for preventing backflow of resin from a front of a screw to surroundings of the screw, comprises:

a screw tip provided on a distal end of the screw with a shaft interposed therebetween, the shaft extending from a rear end surface of the screw tip, and the screw tip having a plurality of grooves in a peripheral portion of the rear end surface;

a check ring fitted around the shaft, the check ring being configured such that a rear end surface of the check ring is separated from a front end portion of the screw and thereby a resin path, in which resin is sent to a front of the screw tip from the surroundings of the screw through a space between the check ring and the shaft, is connected when the screw is rotated in a forward direction to send the resin forward, and such that the rear end surface of the check ring is brought into contact with the front end portion of the screw and thereby the resin path is closed when the screw is advanced, the check ring being provided with a plurality of teeth with which the respective grooves are engaged, wherein each of the grooves has one side surface which is pressed against the corresponding engaged tooth when the screw is rotated in the forward direction and another side surface located on a reverse side of the one side surface, the one side surface is formed vertical to the rear end surface of the screw tip, the another side surface is inclined such that a width of each of the grooves is gradually narrowed toward a bottom thereof, each of the teeth has one side surface against which the corresponding engaged groove is pressed when the screw is rotated in the forward direction and another side surface located on a reverse side of the one side surface, the one side surface is formed vertical to the front end surface of the check ring, and the another side surface is inclined at the same angle as that of the grooves such that a width of each of the teeth is gradually narrowed toward a distal end thereof.

According to the backflow prevention device of the present invention, if the screw is slightly rotated in the backward direction after completion of the charging step, the inclined surface of the side surface of each groove is pressed against the inclined surface of the side surface of the engaged tooth, the tooth slides along the inclined surface, and the check ring is relatively receded with respect to the screw tip. Thereby, the rear end surface of the check ring contacts the front end portion of the screw, and the resin path is closed. Therefore, it is possible to securely prevent the phenomenon in which the resin path of the backflow prevention device is opened in suckback operation subsequent to completion of the charging step.

Preferably, in the backflow prevention device, a stepped portion is provided in the middle of the inclined another side surface (that is, the another side surface located on the reverse side) of each of the grooves of the screw tip, and the stepped portion is configured such that the rear end surface of the check ring contacts the front end portion of the screw when the stepped portion contacts a distal end of the tooth 7.

Forming the grooves as described above enables secure closing of the resin path which connects the surroundings of the screw and the front of the screw tip, when the screw is rotated in the backward direction.

According to the backflow prevention device for in-line screw type injection molding machine of the present invention, the resin path of the backflow prevention device is not opened in suckback operation. Therefore, it is possible to securely prevent the phenomenon in which resin leaks from the surroundings of the screw to the front of the screw tip between the charging step and the filling step.

DETAILED DESCRIPTION OF THE INVENTION (Embodiment 1)

Figure 1:
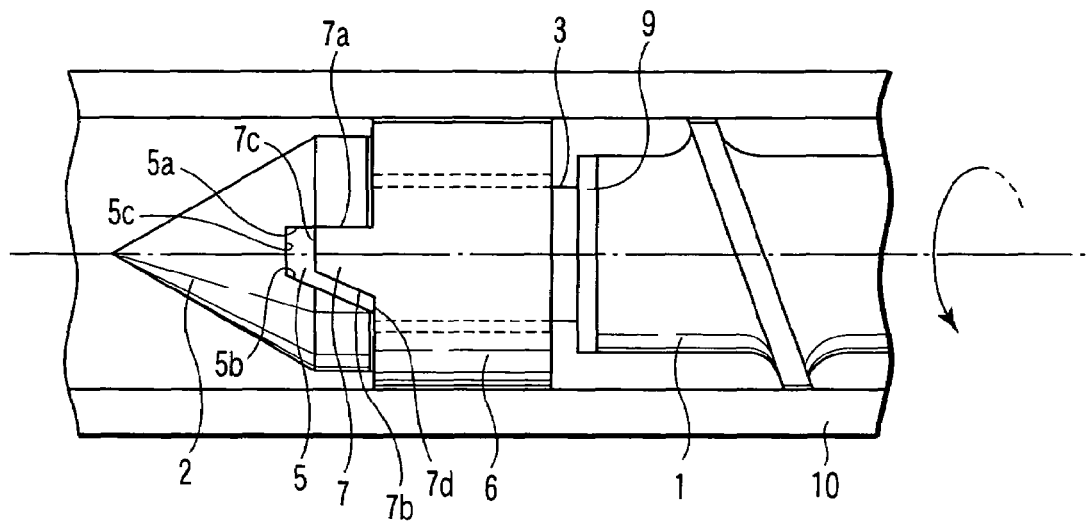
FIG. 1 is a diagram illustrating an embodiment of a backflow prevention device for an in-line screw type injection molding machine according to the present invention, illustrating a state where a screw is rotated in a forward direction.
Figure 2:
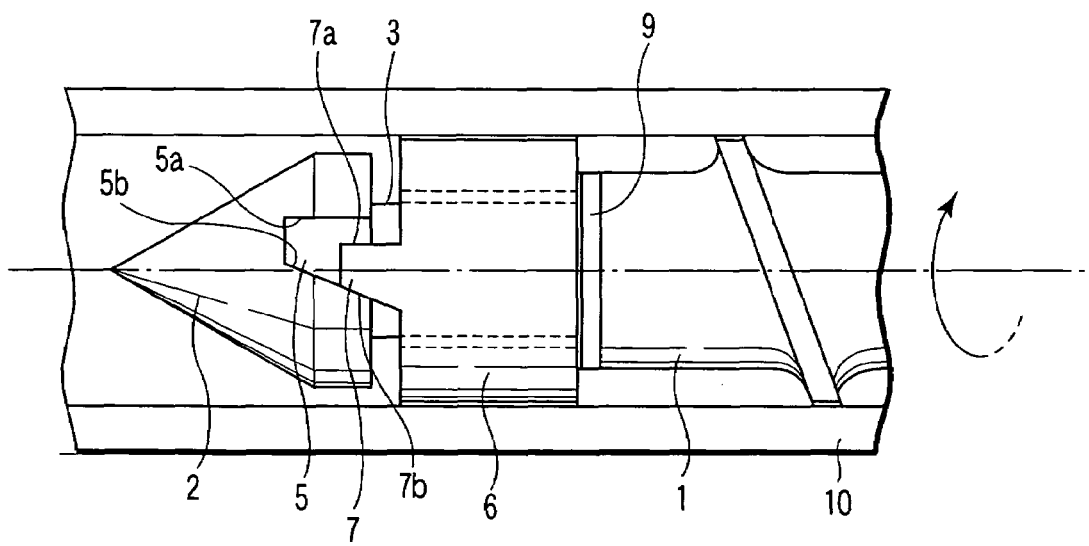
FIG. 2 is a diagram illustrating the embodiment of the backflow prevention device for an in-line screw type injection molding machine according to the present invention, illustrating a state where the screw is rotated in a backward direction.

FIGS. 1 and 2 illustrate an embodiment of a backflow prevention device for an in-line screw type injection molding machine according to the present invention. In FIGS. 1 and 2, reference numeral 1 denotes a screw, 2 denotes a screw tip, 3 denotes a shaft of the screw tip, 5 denotes a groove, 6 denotes a check ring, 7 denotes a tooth, and 10 denotes a heating barrel.

The screw tip 2 is mounted in front of the screw 1 with the shaft 3 interposed therebetween. The shaft 3 extends from a rear end surface of the screw tip 2. The check ring 6 is fitted around the shaft 3. When resin is sent to the front (the left direction in the drawings) by rotating the screw 1 in a forward direction, a resin path is connected by separating a rear end surface of the check ring 6 from a front end portion of the screw 1. Thereby, the resin is sent to the front of the screw tip 2 from the surroundings of the screw 1 through an annular space between the check ring 6 and the shaft 3, then through the gap between the screw tip 2 (portions designated by reference numerals 5a, 5c, 5b) and the check ring 6 (portions designated by reference numerals 7a, 7b, 7c). In comparison with this, when the screw 1 is advanced, the rear end surface of the check ring 6 contact with a spacer 9 attached to the front end portion of the screw 1, and thereby the resin path is closed.

Further, in the backflow prevention device based on the present invention, teeth 7 are provided on a front end surface of the check ring 6, and a plurality of grooves 5 with which the teeth 7 are engaged are provided in a rear end surface of the screw tip 2.

FIG. 1 illustrates a state where the screw 1 is rotated in the forward direction, that is, the state in a charging step. As shown in FIG. 1, each tooth 7 has a side surface 7a against which the engaged groove 5 is pressed when the screw 1 is rotated in the forward direction, and a side surface 7b on the reverse side of the side surface 7b. Each side surface 7a is formed vertical to the front end surface of the check ring 6, and each side surface 7b is inclined such that the width of each tooth 7 is gradually narrowed toward its distal end. In conformity with this, each groove 5 has a side surface 5a which is pressed against the engaged tooth 7 when the screw 1 is rotated in the forward direction, and a side surface 5b on the reverse side of the side surface 5a. Each side surface 5a is formed vertical to the rear end surface of the screw tip 2, and each side surface 5b is inclined such that the width of each groove 5 is gradually narrowed toward its bottom.

FIG. 2 illustrates a state where the screw 1 is slightly rotated in the backward direction after completion of the charging step, that is, the state in suckback operation and a filling step. As shown in FIG. 2, when the screw 1 is rotated in the backward direction, an inclined surface of the side surface 5b of each groove 5 is pressed against an inclined surface of the side surface 7b of the corresponding engaged tooth 7, and a component (component of force) toward the screw 1 acts on the check ring 6. Thereby, teeth 7 slide along the respective inclined surfaces 5b, and the check ring 6 relatively moves back with respect to the screw tip 2. Thereby, the rear end surface of the check ring 6 is brought into contact with the spacer 9 provided on the front end portion of the screw 1, and the resin path connecting the surroundings of the screw 1 and the front of the screw tip 2 is closed.

(Embodiment 2)

Figure 3:
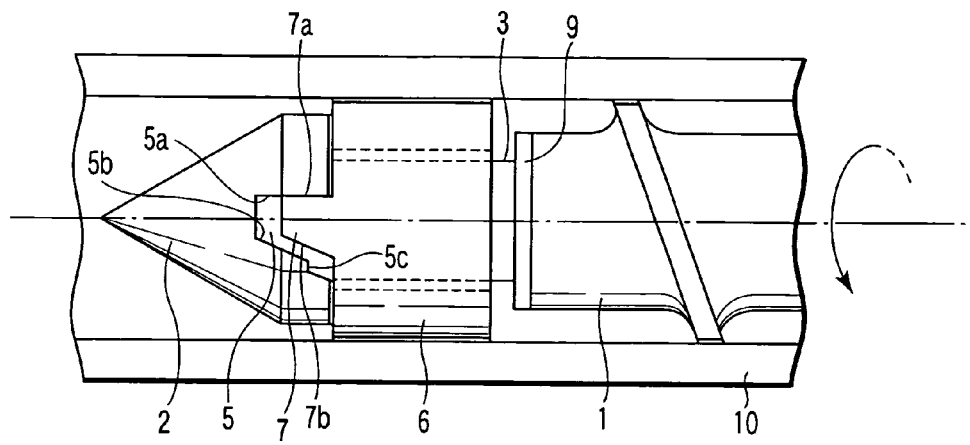
FIG. 3 is a diagram illustrating another embodiment of the backflow prevention device for an in-line screw type injection molding machine according to the present invention, illustrating a state where a screw is rotated in a forward direction.
Figure 4:
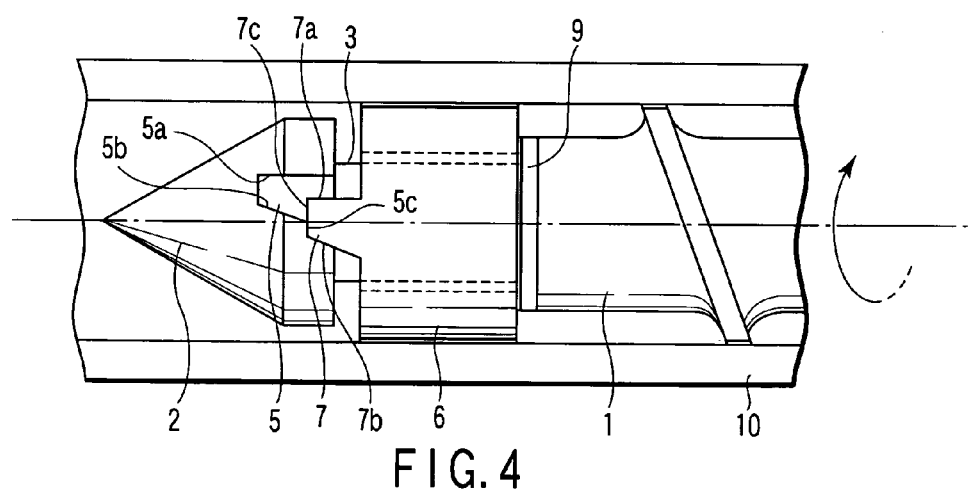
FIG. 4 is a diagram illustrating said another embodiment of the backflow prevention device for an in-line screw type injection molding machine according to the present invention, illustrating a state where the screw is rotated in a backward direction.
Figure 5:
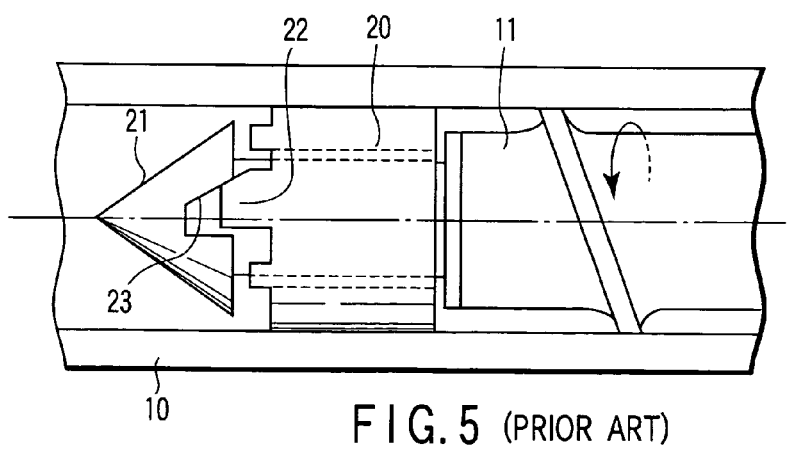
FIG. 5 is a diagram illustrating an example of a conventional backflow prevention device for an in-line screw type injection molding machine.

FIGS. 3 and 4 illustrate another embodiment of a backflow prevention device for in-line screw type injection molding machine based on the present invention. In this embodiment, a stepped portion 5c is provided in the middle of an inclined side surface 5b of each groove 5. The other parts of the embodiment are the same as those in the above first embodiment.

FIG. 3 illustrates a state where a screw 1 is rotated in the forward direction, that is, a state in the charging step. This state is substantially the same as the state shown in FIG. 1 in the above first embodiment.

FIG. 4 illustrates a state where the screw 1 is slightly rotated in the backward direction after completion of the charging step, that is, a state in suckback operation and the filling step. As shown in FIG. 4, the position in which the stepped portion 5c is provided is set such that a rear end surface of a check ring 6 contacts a spacer 9 provided on a front end surface of the screw 1 when the stepped portion 5c contacts a distal end 7c of a tooth 7. By forming the shape of each groove 5 as described above, when the screw 1 is rotated in the backward direction, a relative position of the check ring 6 to the screw tip 2 is fixed, and it is possible to securely close the resin path inside the check ring 6.

What is claimed is:

1. A backflow prevention device for an in-line screw injection molding machine, the device being used for preventing backflow of resin from a front of a screw to surroundings of the screw, the device comprising:

a screw tip provided on a distal end of the screw with a shaft interposed therebetween, the shaft extending from a rear end surface of the screw tip, and the screw tip having a plurality of grooves in a peripheral portion of the rear end surface;

a check ring fitted around the shaft, the check ring being configured such that a rear end surface of the check ring is separated from a front end portion of the screw and thereby a resin path, in which resin is sent to a front of the screw tip from the surroundings of the screw through a space between the check ring and the shaft, is connected when the screw is rotated in a forward direction to send the resin forward, and such that the rear end surface of the check ring is brought into contact with the front end portion of the screw and thereby the resin path is closed when the screw is advanced, the check ring being provided with a plurality of teeth with which the respective grooves are engaged, wherein each of the grooves has one side surface which is pressed against the corresponding engaged tooth when the screw is rotated in the forward direction and another side surface located on a reverse side of said one side surface, said one side surface is formed vertical to the rear end surface of the screw tip, said another side surface is inclined such that a width of each of the grooves is gradually narrowed toward a bottom thereof, each of the teeth has one side surface against which the corresponding engaged groove is pressed when the screw is rotated in the forward direction and another side surface located on a reverse side of said one side surface, said one side surface is formed vertical to a front end surface of the check ring, and said another side surface is inclined at the same angle as that of the grooves such that a width of each of the teeth is gradually narrowed toward a distal end thereof, wherein a stepped portion is provided in the middle of said inclined another side surface of each of the grooves of the screw tip, and the stepped portion is configured such that the rear end surface of the check ring contacts the front end portion of the screw when the stepped portion contacts a distal end of the tooth.

* * * * *